(No Model.)

J. U. BURT.
TIRE FOR CARRIAGE WHEELS.

No. 356,919. Patented Feb. 1, 1887.

WITNESSES
O. Fred Hallock
Vernon M. Dorsey

INVENTOR
John U. Burt.
By his Attorney
C. S. Whitman

UNITED STATES PATENT OFFICE.

JOHN UTBER BURT, OF SWINTON STREET, COUNTY OF MIDDLESEX, ENGLAND.

TIRE FOR CARRIAGE-WHEELS.

SPECIFICATION forming part of Letters Patent No. 356,919, dated February 1, 1887.

Application filed September 6, 1886. Serial No. 212,836. (No model.) Patented in England January 5, 1886, No. 191.

*To all whom it may concern:*

Be it known that I, JOHN UTBER BURT, a citizen of England, residing at Swinton Street, in the county of Middlesex, England, have invented a new and useful Improvement in Tires for Wheels of Carriages and other Vehicles, (for which I have applied for a patent in Great Britain, dated January 5, 1886, No. 191,) of which the following is a specification.

My invention relates to the tires of wooden wheels, such as are used for carriages and other vehicles, the object which I have in view being to provide for fixing the tire securely on the wheel without screws, rivets, or other fastenings, without weakening or damaging the fellies, and with protection to the fellies against damage from curbs or other lateral obstructions. For this purpose, in forming the tire I use a bar of iron or steel which has at one edge of it a light flange or projecting lip. I bend this bar and weld it in the usual way to form a complete ring, and I turn the circumference of the fellies preferably with a slight slope inward—that is to say, with the diameter next the vehicle a little less than that farthest from the vehicle. I heat the tire so as to expand it, and lay it on a flat surface. I then drop the wheel into the heated tire. The tire, shrinking, binds itself firmly on the wheel, its flange preventing it from shifting in the one direction and the slight conical form of the fellies preventing it from shifting in the other direction.

Figure 1:
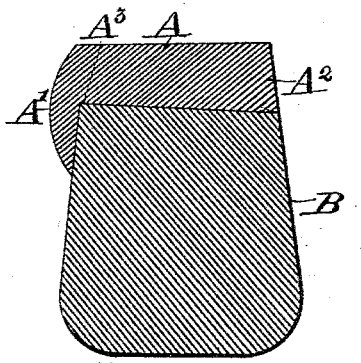
Figure 2:
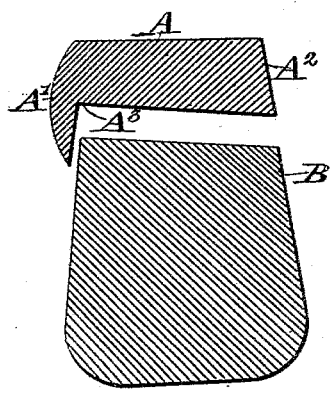

In the accompanying drawings, Figure 1 shows the section of a felly and tire constructed according to my invention. Fig. 2 is a section showing the tire and felly detached.

The tire A is made with an inwardly-projecting lip or flange, A′, and its diameter at A² is slightly smaller than at A³, the felly B being turned with a slight slope to correspond. On heating the tire it expands sufficiently to allow the felly to enter through A², so that when the tire is shrunk on it is held securely on the one side by the flange A′ and on the other side by the tapering form of the felly.

Having thus described the nature of my invention and the best means I know for carrying the same into practical effect, I claim—

A tire having on its one edge an inwardly-projecting flange or lip and fitting with its inner surface upon a felly whose diameter at the edge next the flange is slightly greater than that of the opposite edge, substantially as and for the purposes set forth.

In testimony whereof I have signed my name to this specification, in the presence of two subscribing witnesses, this 24th day of August, A. D. 1886.

JOHN UTBER BURT.

Witnesses:
 OLIVER INNARE,
  *Patent Agent,*
 L. V. BRINDLEY,
*Both of 28 Southampton Buildings, London, W.C.*